United States Patent [19]

Frank et al.

[11] Patent Number: 5,341,350

[45] Date of Patent: Aug. 23, 1994

[54] COIN OPERATED JUKEBOX DEVICE USING DATA COMMUNICATION NETWORK

[75] Inventors: Armin Frank, Mönchweiler; Horst Niederlein, Bingen, both of Fed. Rep. of Germany

[73] Assignee: NSM Aktiengesellschaft, Bingen, Fed. Rep. of Germany

[21] Appl. No.: 961,920

[22] PCT Filed: Jul. 4, 1991

[86] PCT No.: PCT/DE91/00560
§ 371 Date: Jan. 7, 1993
§ 102(e) Date: Jan. 7, 1993

[87] PCT Pub. No.: WO92/01342
PCT Pub. Date: Jan. 23, 1991

[30] Foreign Application Priority Data

Jul. 7, 1990 [DE] Fed. Rep. of Germany ....... 4021707

[51] Int. Cl.⁵ .............................................. G11B 17/22
[52] U.S. Cl. .................................. 369/30; 340/825.35
[58] Field of Search ...................... 369/30; 379/67, 68, 379/74, 87, 88, 89; 340/825.06, 825.24, 825.35, 825.25, 825.15; 455/4.1, 6.3

[56] References Cited

U.S. PATENT DOCUMENTS

| 3,798,811 | 3/1974 | Rockola | 40/124.2 |
| 4,282,575 | 8/1981 | Hoskinson et al. | 364/479 |
| 4,471,379 | 9/1984 | Stephens | 358/120 |

FOREIGN PATENT DOCUMENTS

| 0140593 | 5/1985 | European Pat. Off. . |
| 2944177 | 5/1981 | Fed. Rep. of Germany . |
| 3207022 | 9/1983 | Fed. Rep. of Germany . |
| 3830300 | 3/1990 | Fed. Rep. of Germany . |
| 9015497 | 12/1990 | PCT Int'l Appl. . |
| 2062935 | 5/1981 | United Kingdom . |
| 2185361 | 7/1987 | United Kingdom . |
| 2193420 | 2/1988 | United Kingdom . |

Primary Examiner—Robert J. Pascal
Assistant Examiner—Tan Dinh
Attorney, Agent, or Firm—Spencer, Frank & Schneider

[57] ABSTRACT

A coin-operated music playing machine or jukebox includes a coin unit, a viewing screen, an input keyboard, and at least one loudspeaker. The jukebox is connected to a central music store via a remote data transmission line, preferably an ISDN line. The jukebox has digital/analog converters and amplifiers for information transmitted via the remote data transmission line. The jukebox also includes an intermediate memory for storing audio information received over the remote data transmission line and a mass storage memory for frequently played selections.

21 Claims, 2 Drawing Sheets

COIN OPERATED JUKEBOX DEVICE USING DATA COMMUNICATION NETWORK

BACKGROUND OF THE INVENTION

The invention relates to a coin operated jukebox including a payment unit such as a coin unit, a display, an input keyboard and at least one loudspeaker.

Such coin operated jukeboxes are set up at many locations, particularly in restaurants. Usually, they include an audio record magazine equipped with a changer and a playback unit which plays an audio record selected by a user. While some audio records that are played continuously with a certain frequency are always available in the magazine, others, whose titles are not so popular or which contain the current hits, are exchanged more frequently. The display provided on the jukebox usually indicates the titles of the audio records available in the magazine.

In a coin operated jukebox as disclosed in German Patent 2,944,177, audio records are employed which contain a additional machine readable information on each side. When a selected audio record is accessed, this information is read and stored, with the position corresponding to each record being stored in a memory. The reading of the respective additional information makes it possible to obtain information about the use of the jukebox and to evaluate such data by means of a computer included in the jukebox. For the person setting up the jukebox, this facilitates the selection of the most popular records.

With increasing frequency of use of data telecommunications, the possibilities available to the users of such transmission systems have continuously broadened. In the meantime it is possible to transmit text, graphics, audio, video and film information with sufficient quality. For this purpose, such information call-up systems equipped with a dialog network employ narrowband dialog systems. For video transmissions, broadband information call-up systems must be employed. In an information call-up system disclosed in DE-OS [Unexamined Published German Patent Application] 3,207,022 for narrowband and broadband information, the broadband information call-up center may be configured as an audio-visual information bank equipped with appropriate controls from which the broadband information is called up. A digital telephone network or an ISDN [integrated service digital network] network is employed as the data telecommunications line. If such an ISDN network is employed, high transmission rates can be realized. The data reduction methods employed here (1 bit reduction method) make it possible to transmit music with high sound quality.

SUMMARY OF THE INVENTION

It is the object of the invention to provide a coin operated jukebox which can be produced economically and has simple operating characteristics.

A coin operated jukebox according to the invention includes a coin unit, a display, an input keyboard and at least one loudspeaker. By way of a data telecommunications line, the jukebox is connected with a central music store, with the data telecommunications line being suitable for the transmission of audio information. The jukebox further includes digital/analog converters and amplifiers for the audio information received by way of the data telecommunications line.

Thus, a jukebox according to the invention is not itself equipped with a playback unit and the corresponding further accessory units, but rather the jukebox is connected to a central music store and is able to call up from it the desired information, that is, the selected music pieces. Thus the amount of apparatus required for the individual jukebox is reduced and so is the extent of service and maintenance work because no storage and exchange of audio records is required at the individual jukebox. This is necessary only for the central music store, which is able to hold a much greater number of music selections than an individual jukebox. A data telecommunications line is provided for the transmission of the music from the central music store to the individual jukebox. This data telecommunications line must of course be suitable for the transmission of audio information and should advisably be an ISDN line. The use of such integrated digital data transmission technology permits the transmission of musical data with high quality and speed.

For conversion of the transmitted audio signals, the individual jukebox is provided with digital/analog converters and amplifiers. Since a playback unit is not required if the jukebox is set up commercially, the jukebox according to the invention can be configured very compactly as a so-called cable-end unit, e.g., in the form of a stand-alone or wall mounted unit.

The jukebox includes a display, preferably a viewing screen unit, on which the music pieces available by way of the central music store and their titles, author, artist, etc. are displayed. The desired title can then be selected by means of the input keyboard. After paying the appropriate fee, the selected musical piece is then called up from the music store and is played. The listener is unable to discern a difference from the direct playback by means of a playback unit installed in the jukebox.

The jukebox configuration according to the invention makes it possible to employ an entire system of relatively inexpensive playback end units or terminals and one central music store having a correspondingly larger capacity which can be utilized more effectively.

According to a further feature of the invention, it is also possible to integrate the end unit in a conventional audio record player, a tape recorder, a television receiver, etc., which may also be set up in a private home. For this purpose it is merely necessary to modify the coin unit. The latter may be configured, for example, as a fee compilation unit similarly as for telephones and provide invoices, charges and/or fee accounting.

In such an overall system, the central store is advisably a data bank for music selections which may be appropriately integrated in a data processing system.

In order to be able to take advantage of the data transmission rate, the audio signals are advisably stored in an intermediate memory in the jukebox, that is, in the end unit, and are transferred from there to the loudspeaker. Thus the expensive data transmission time and occupation of the data telecommunications line can be kept as short as possible, which also has the advantage that access to the central store is possible for the largest possible number of users.

In the case of more frequently selected titles, it may happen that they are requested simultaneously. For this purpose, a separate memory is provided in the jukebox according to the invention which may be a diskette station and/or a fixed disk. So-called hits are then transmitted from the central store to the jukebox and are stored in its hit memory from where they can then be played back directly.

The central store may be a record player equipped with a record magazine of one hundred or more audio records which can be removed for playback and returned by way of changer units and computer control. However, magnetic tape cassettes, magnetic disks, optical disks, etc., may also be employed as storage medium.

The payment unit need not be a coin unit in the narrower sense which is intended to receive and process coins. Rather, this unit may also be a unit for processing bank notes. Additionally, it may also be possible to provide for the processing of cards, particularly magnetically coded cards or, as already mentioned, charges and account transactions for the individual end units may also be effected.

In another preferred embodiment of the invention, a central computer is provided which stores and/or processes user data for the individual jukeboxes, and the jukebox is connected with the central computer. Storage and/or processing of user data will hereafter be collectively called "processing" the user data. The central computer is equipped with an operator code unit which permits access to the central computer and the corresponding user data. This embodiment permits the person setting up the such a jukebox to call up machine and user data of interest to him. In this way it is easy to determine which music selections are played most frequently, a popularity display may be obtained, the status of cash on hand can be determined according to the call-up of the music selections, and accounts can be settled by way of the central computer.

Advantageously, the jukebox itself may include a computer, particularly a microcomputer, which stores and processes user data, as well as an operator code unit which grants access to the computer and user data. By centrally recording the selections played, it is possible for the operator of such a jukebox to obtain data about the use of the jukebox and the frequency of the playing of individual titles without cost-incurring use of the telecommunications line.

As mentioned, the central music store may include a playback unit and optically or magnetically playable information carriers for music selections. Moreover, further audio information may be included in the central music store, e.g., radio plays, recorded speeches, etc. The central store may also include video information and, insofar as the jukebox includes a viewing screen, a video signal transmission may take place in addition to or as an alternative to the audio signal transmission and, for example, movies with sound may be played.

BRIEF DESCRIPTION OF THE DRAWINGS

The invention will now be described in greater detail with reference to an embodiment thereof and the drawing, in which.

DESCRIPTION OF THE PREFERRED EMBODIMENTS

Figure 1:
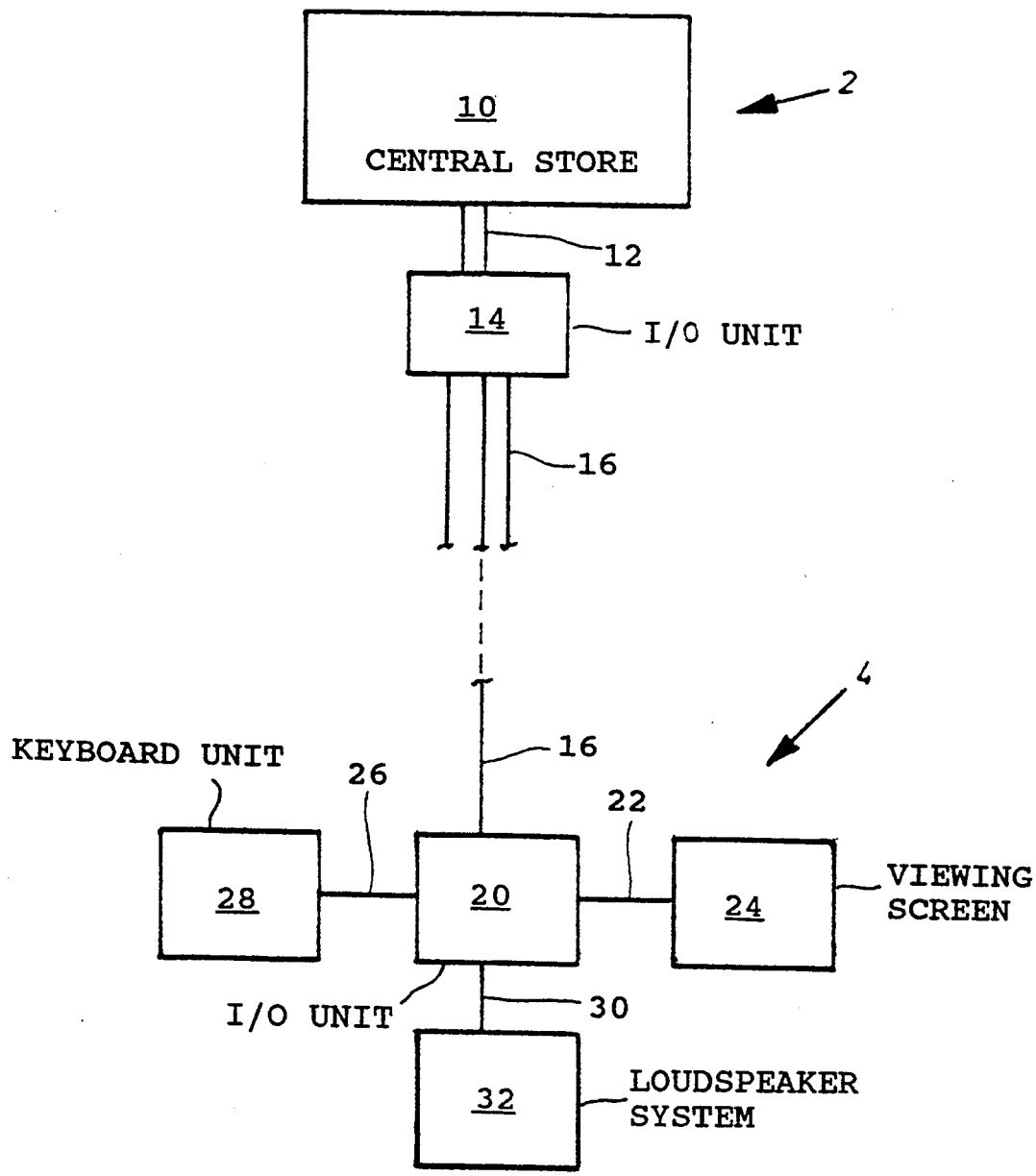
FIG. 1 is a schematic block circuit diagram for a jukebox system according to the invention.

A jukebox system as shown schematically in FIG. 1 includes a central unit 2 and a plurality of decentralized end units 4 which are connected with the central unit 2.

Central unit 2 includes a central store 10 which may be connected with a non-illustrated computer. Central store 10 may include a magazine arrangement of audio records and a playback device or magnetic or optical disks containing stored audio information. Central store 10 is connected by way of a bus 12 with an input/output unit 14 which, depending on the layout and configuration of the central store, may be equipped with a control unit, a computer, etc. A plurality of data telecommunications lines 16, e.g., ISDN lines, are connected to input/output unit 14.

Each data telecommunications line 16 is connected with the input/output unit 20 of an end unit 4 which at its location is intended to replace the conventional jukebox. Input/output unit 20 is connected by way of a line 22 with a viewing screen 24 which constitutes the display of end unit 4. Viewing screen 24 displays, e.g., the music selections that can be played by the jukebox, with these selections being sorted, e.g., according to title, artist, popularity ranking, and the like. Moreover, input/output unit 20 is connected by way of a line 26 with an input keyboard 28. The selection instructions fed in by way of the input keyboard are displayed on viewing screen 24 and the respectively selected music piece is made visible or identified. For a final selection, the input keyboard may include a confirmation key. The input/output unit is additionally connected by way of a further line 30 with a loudspeaker system 32. Moreover, the input keyboard may also be replaced by a touch screen system.

End unit 4 may be designed in such a way that it includes only the input/output units required for the selection of music pieces and the required playback units, such as loudspeaker system 32. The remaining units may be included in central unit 2 which, depending on the configuration of the jukebox system, may also perform the processing of the user data. In that case, the central unit includes a central computer. To secure the data stored in the central computer and processed by it, an operator code unit may be provided in the external end unit 4. This unit may also be reduced to such an extent that a password is stored in it the input of which permits access to the computer and the user data. Thus the person setting up the device is able to perform accounting functions and evaluations under central control. The monitoring and payment of GEMA [=Gesellschaft für musikalische Aufführungsund mechanische Vervielfältigungsrechte=Association for Musical Performance and Mechanical Reproduction Rights] fees is also simplified in such a centralized system.

Figure 2:
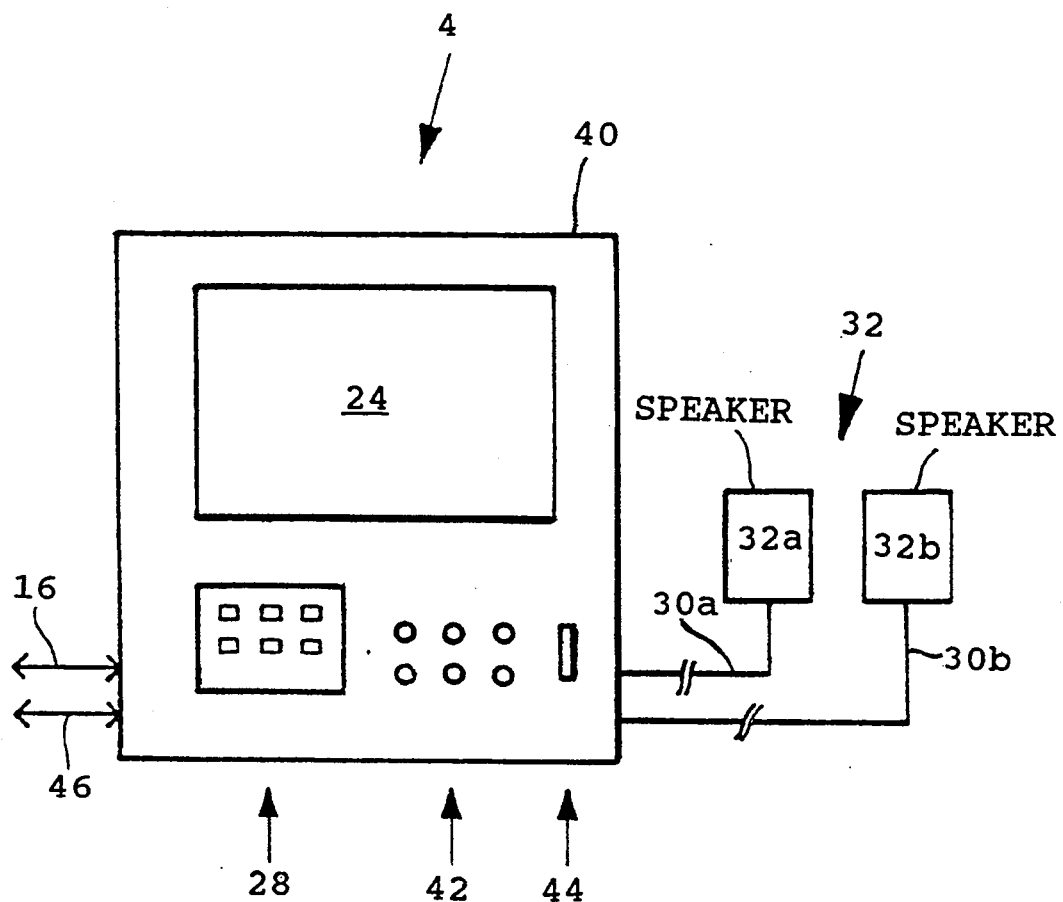
FIG. 2 is a schematic representation of a jukebox end unit.

The configuration of an end unit 4 is shown schematically in FIG. 2. This jukebox includes a housing 40 which is provided with a viewing screen 24 and an input keyboard 28. Moreover, operator buttons and keyboards 42 are provided with which the viewing screen display and the loudspeakers 32a and 32b of loudspeaker system 32 can be adjusted. They also include an On/Off switch. Moreover, the frontal face of housing 40 is provided with a slot 44 for the insertion of magnetically coded cards to a payment unit, instead of a conventional coin unit as the payment unit. Housing 40 is provided with a connection for a data telecommunications line 16. A connection for a network cable 46 is also provided.

We claim:

1. An improved jukebox which is connected with a central music store by way of a data telecommunications line suitable for the transmission of audio information, the jukebox including a digital/analog converter and an amplifier for audio information picked up by way of the data telecommunications line, a payment unit, a display, an input keyboard, and at least one loudspeaker, wherein the improvement comprises:

an intermediate memory is provided for the audio information picked up over the data telecommunications line;

a memory is provided for frequency played musical selections;

a central computer is provided which processes user data for the individual jukeboxes and the jukebox connected with the central computer includes an operator code unit which permits access to the central computer and the corresponding user data; and the jukebox includes a computer which processes user data.

2. A jukebox according to claim 1, wherein the data telecommunications line comprises an ISDN line.

3. A jukebox according to claim 1, wherein the central music store comprises a data bank for musical selections.

4. A jukebox according to claim 1, wherein the intermediate memory comprises a storage apparatus selected form the group consisting of a diskette station, a fixed disk, and a cache memory.

5. A jukebox according to claim 1, wherein the display comprises a viewing screen.

6. A jukebox according to claim 1, wherein the payment unit is configured to process paper money.

7. A jukebox according to claim 1, wherein the payment unit is configured to process cards.

8. A jukebox according to claim 1, wherein the central music store includes a playback unit and optically playable information carriers for musical selections.

9. A jukebox according to claim 1, wherein the central music store includes further audio information.

10. A jukebox according to claim 1, wherein the display of the jukebox includes a viewing screen, and wherein the central music store includes graphic information.

11. A jukebox according to claim 1, in the form of a playback unit, wherein the payment unit is configured as a fee compiling unit giving account statements.

12. A jukebox according to claim 1, in the form of a playback unit, wherein the payment unit is configured as a fee compiling unit giving charges.

13. A jukebox according to claim 1, in the form of a playback unit, wherein the payment unit is configured as a fee compiling unit giving an accounting of fees due.

14. A jukebox according to claim 1, wherein the memory for frequently played musical selections comprises a storage apparatus selected from the group consisting of a diskette station, a fixed disk, and a cache memory.

15. A jukebox according to claim 1, wherein the central music store includes a playback unit and magnetically playable information carriers for musical selections.

16. A jukebox according to claim 1, wherein the display of the jukebox includes a viewing screen, and wherein the central music store includes video information.

17. An improved jukebox for connection with a central music store by way of a data telecommunications line, the jukebox including a digital/analog converter and an amplifier for audio information received from the central music store by way of the data communications line, an input unit for entering selections by users of the jukebox, and at least one audio transducer, wherein the improvement comprises:

the jukebox includes a mass storage memory for storing a plurality of musical selections that have been received from the central music store by way of the data communications line.

18. The jukebox of claim 17, wherein the mass storage memory comprises a diskette station.

19. The jukebox of claim 17, wherein the mass storage memory comprises a fixed disk.

20. The jukebox of claim 17, further comprising an intermediate memory for temporarily storing a musical selection which has been received from the central music store by way of the data communications line, and wherein the mass storage memory comprises a cache memory.

21. The jukebox of claim 17, further comprising an intermediate memory for temporarily storing a musical selection which has been received from the central music store by way of the data communications line, a payment unit, and a computer which stores and processes user data.

* * * * *